United States Patent [19]

Hellwig

[11] 4,360,714
[45] Nov. 23, 1982

[54] TELEPHONE MOVEABLE CRADLE LOCK

[75] Inventor: Kurt E. Hellwig, Downingtown, Pa.

[73] Assignee: Burroughs Corporation, Detroit, Mich.

[21] Appl. No.: 183,060

[22] Filed: Sep. 2, 1980

[51] Int. Cl.³ .............................................. H04M 1/66
[52] U.S. Cl. .......................... 179/189 R; 70/DIG. 72
[58] Field of Search ...... 179/189 R; 70/202, DIG. 72

[56] References Cited

U.S. PATENT DOCUMENTS

| | | | |
|---|---|---|---|
| 852,806 | 5/1907 | Smith et al. | 179/189 R |
| 986,952 | 3/1911 | Soles | 179/189 R |
| 1,172,614 | 2/1916 | Lavalley | 179/189 R |
| 1,518,751 | 12/1924 | Owen | 179/189 R |

OTHER PUBLICATIONS

Western Electric Technical Digest No. 60 Oct. 1980, pp. 23–24 Lock For, "Call Director ®", Telephone Set, O. Wagner.
Western Electric Technical Digest No. 32 Oct. 1973, p. 25, Security Key Lock, W. A. Kasyan.

Primary Examiner—George G. Stellar
Attorney, Agent, or Firm—Mark T. Starr; Edmund M. Chung; Kevin R. Peterson

[57] ABSTRACT

A locking device for telecommunications transceivers includes a key operated lock cylinder contained in a frame designed to fit between a transceiver's side mounted cradle and the opposed side of the transceiver's base, a latch bar attached to the lock cylinder and rotatable with the lock cylinder to engage the cradle in such a manner as the frame may not be removed, the frame acting as a wedge which holds the cradle down and keeps the transceiver electrically inactive.

16 Claims, 3 Drawing Figures

TELEPHONE MOVEABLE CRADLE LOCK

BACKGROUND OF THE INVENTION

Unauthorized persons utilizing office telephones to make personal phone calls has always been a problem. Most of this unauthorized use occurs after normal business hours when office personnel are not present to see who is utilizing the telephones.

In order to protect against unauthorized telephone calls, a number of mechanical security devices are available. Thus, the familiar dial lock prevents the dialing mechanism on a dial type telephone from being rotated. For use on a desk style Touch Tone set, a device is available which covers the pushbuttons, thus preventing the user from keying in a number. Another locking device available for use on desk style phones, including both dial and Touch Tone types, is that described in U.S. Pat. No. 3,712,964, issued Jan. 23, 1973. This device prevents both outgoing and incoming calls by holding the switch pins down and thus keeping the telephone electrically inactive.

Although at least one of the above devices will at least partially protect all types of standard desk style phones and all styles of phones having rotary dials, they cannot be used on "Call Director" style Touch Tone units. Call-Director style telephones are those having the handset mounted on one side of the base, and normally have multiple pushbuttons for switching between multiple incoming/outgoing lines. Call-Director style phones may include either a Touch Tone or rotary dialing capability. Often, however, Call-Director style phones are ordered with a dial rather than the Touch Tone feature because of the inability to electrically secure the Touch Tone type units.

It is the general object of the present invention to provide a telephone lock for use on Call-Director-style telephone receivers.

It is another object of the present invention to provide a telephone lock for Call-Director-style telephones which keeps the telephone electrically inactive.

It is a further object of the present invention to provide a cradle lock for Call-Director-style receivers which prevents outgoing calls and incoming collect calls.

It is still another object of the present invention to provide an inexpensive telephone lock for use on both dial and Touch Tone type Call-Director-style transceivers.

The above and other objects, features and advantages of the present invention will become more apparent from the detailed description of the preferred embodiment when read in conjunction with the drawings.

SUMMARY OF THE INVENTION

In accordance with the present invention, there is provided a rigid frame which may be positioned between one side of the telephone handset cradle and the opposed side of the telephone base. With the telephone handset cradle depressed and the frame so positioned, a key operated cylinder attached to the frame may be rotated to position an attached latch bar under the bottom of the telephone's cradle, thus preventing the frame's removal. Once so positioned, the frame acts as a wedge which prevents the cradle from moving toward and upward with respect to the telephone's base, thus preventing the telephone from becoming electrically active.

DESCRIPTION OF THE PREFERRED EMBODIMENT

Figure 1:
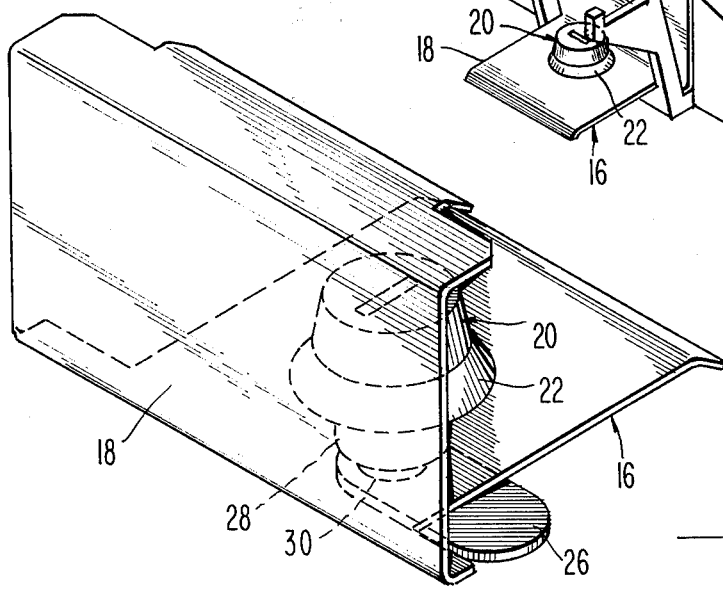
FIG. 1 is a pictorial view of the locking device of the present invention.

Referring now to the drawings, FIG. 1 pictorially illustrates the preferred embodiment of the locking device 16 of the present invention.

In the preferred embodiment, the lock body 18 is made of steel approximately one-sixteenth of an inch thick. A key-operated lock cylinder 20 is non-rotatably mounted on the body 18, the squared-off shape of the lock-cylinder's exterior casing 28 matched by the shape of the hole in the body 18 through which is passes.

The lock cylinder 20 is secured in position via space maintaining washer 22 and locking nut 24, the locking nut 24 engaging with threads in the squared off exterior portion 28 of the cylinder 20. In the preferred embodiment, an epoxy-type adhesive is utilized to permanently secure the locking nut 24 in position against the contacted surface of the lock body 18.

Again referring to FIG. 1, a latch bar 26 is attached to the end of the inner rotatable portion 30 of the lock cylinder 20 which is rotatable via a lock cylinder 20 key (not shown). In the preferred embodiment, the latch bar 26 is secured to the inner portion 30 of the lock cylinder 20 by a screw (not shown), which is then locked in place by an epoxy-type adhesive.

Figure 3:
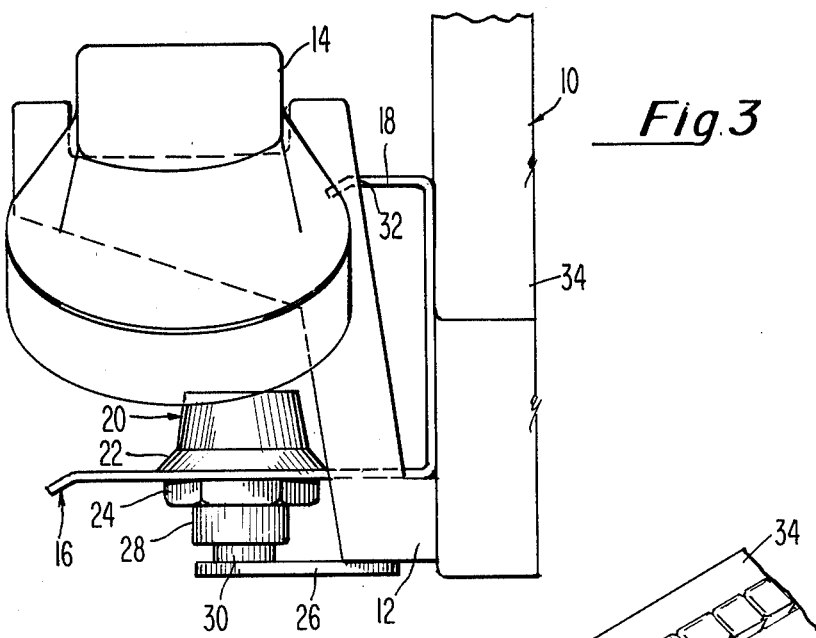
FIG. 3 is another pictorial view of the locking device installed on a Call-Director-style telephone, this view showing the locking device's latch bar positioned under the telephone handset cradle, thus preventing the locking device from being removed.
Figure 2:
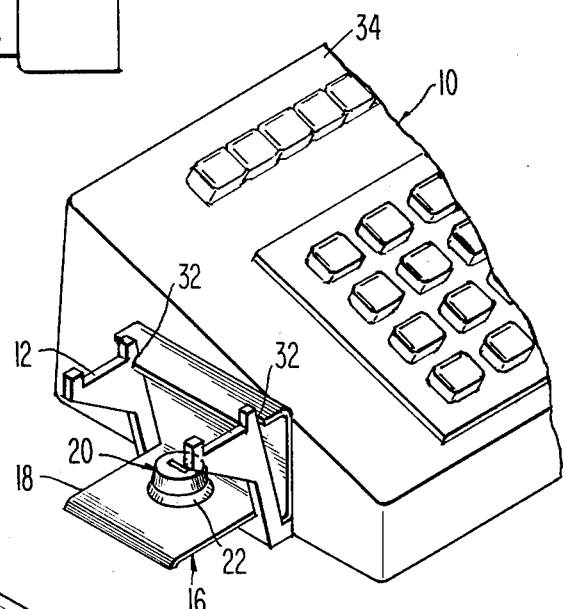
FIG. 2 pictorially illustrates the locking device of the present invention installed and locked on a "Call Director" style telephone.

With reference now to both FIGS. 2 and 3, the manner of installing the locking device 16 on a "Call-Director" style telephone 10 will be explained. Although explained with reference to a Call-Director type telephone 10, those skilled in the art will appreciate that the locking device 16 may find use in other types of telephones and telecommunications transceivers.

In order to install the locking device 16, the user removes the handset 14 (FIG. 3) from the cradle 12, and pushes the cradle 12 down to the lower limit of its travel; that is, the user holds the cradle 12 in the position it would be in if the handset 14 was not removed from its cradle 12. With the inner portion 30 of the lock cylinder 20 rotated (via its key, not shown) to position the latch bar 26 as shown in FIG. 1, viz. in the unlocked position, the locking device 16 is positioned between the cradle 12 and the adjacent side of the base 34 as shown in FIG. 2. Once positioned, the inner portion 30 of the lock cylinder 20 is rotated via its key to position the latch bar 26 as shown in FIG. 3; viz., in the locked position. Once in the locked position, the user no longer need hold down the cradle 12.

When the locking device 16 is installed and locked on the telephone 10, the lock body 18 acts as a wedge which keeps the cradle 12 in the position where the telephone is electrically inactive; viz., in the "on-hook" position. Thus, referring to FIG. 2, with the lock body 18 wedged in the position shown between the cradle 12 and adjacent side of the base 34, the cradle is blocked (at points 32) from being moved closer to (or up with respect to) the adjacent side of the base 34, and such movement is necessary in order for the spring-loaded cradle to move upward and thus electrically activate the telephone 10. Further, since the latch bar 26 is positioned under the bottom of the bottom of the cradle 12 (FIG. 1), the section of the lock body 18 acting as a wedge cannot be removed from its position holding down the cradle 12. Thus, unless and until the latch bar 26 is moved to the unlocked position, the locking device 16 cannot be removed and the telephone 10 remains electrically inactive, thus preventing persons from making outgoing calls or accepting incoming calls.

In order to remove the locking device 16, the user removes the handset 14 from the cradle 12 (if the handset 14 was on the cradle 12), and using the key (not shown) rotates the inner portion 30 of the lock cylinder 20 to position the latch bar 26 as shown in FIG. 1. Next, while holding down the cradle 12, the user lifts out the locking device 16, thereby disengaging it from the telephone.

Having shown and described the preferred embodiment of the present invention, those skilled in the art will realize that various omissions, substitutions and changes in forms and details may be made without departing from the spirit of the invention. It is the applicant's intention therefore to be limited only by the scope of the following claims.

What I claim is:

1. A device for securing a telecommunications transceiver in an electrically inactive state, said transceiver characterized as having a cradle mounted on a side of its base, said transceiver in an electrically inactive state when said cradle is in a depressed position, said device comprising:
   frame means, insertable between said cradle and the base of said transceiver without disassembly of said transceiver, said frame means for depressing and holding said cradle in said depressed position; and
   locking means, fixed to said frame means, said locking means for preventing the removal of said frame means from said transceiver, said locking means including
   a circular type lock, and
   a latch bar, connected to the cylinder of said lock and rotatable to engage said latch bar under and against said cradle, thereby preventing the removal of said device from said transceiver.

2. The device in accordance with claim 1 wherein said circular type lock is key-operated.

3. The device in accordance with claim 1 wherein said frame means includes at one extremity thereof a first extension angularly disposed with respect thereto, said first extension adapted to engage an upper surface of said cradle, said frame means including at the other extremity thereof a second extension angularly disposed with respect thereto, said second extension for containing said locking means, said frame means further including a plane central portion disposed between and connecting said first and second extensions.

4. The device in accordance with claim 3 wherein said first and second extensions intersect with said central portion at substantially right angles and extend from the same side of said central portion.

5. The device in accordance with claim 4 wherein said circular type lock passes perpendicularly through said second extension and said latch bar is positioned on the side of said second extension which does not oppose said first extension.

6. The device in accordance with claim 1 wherein said frame means includes an intermediate section and first and second terminal sections connected to the ends of the intermediate section, the intermediate section including a planar rectangular section, the first terminal section connected to a first end of the intermediate section at a substantially right angle, said first terminal section adapted to depress the cradle and hold it depressed, the second terminal section connected to the second end of said intermediate section at a substantially right angle, the second terminal section also adapted to abut against said cradle.

7. The device in accordance with claim 6 wherein said lock is mounted on said second terminal section with said connected latch bar on the outside of said frame means.

8. The device in accordance with claim 7 wherein said first and second terminal sections extend from the same side of said intermediate section.

9. A device for use with a Call Director telephone set to prohibit anyone from using the set while it is unattended, said device comprising:
   frame means, insertable between the vertical portions of the switchhook arms and the base of the telephone set without disassembly of said telephone set, said frame means for depressing and holding the switchhook arms in a depressed position;
   a circular type lock mounted on said frame means, said lock secured to said frame to hinder its removal; and
   a latch bar connected to the rotatable portion of said lock.

10. The device in accordance with claim 9 wherein said lock may be rotated to position said latch bar under and against the bottom of said switchhook, thereby preventing said frame means from being removed from between the vertical portions of the switchhook arms and the base of the telephone set.

11. The device in accordance with claim 10 wherein said frame means includes an intermediate section and first and second terminal sections connected to the ends of the intermediate section, the intermediate section including a planar rectangular section, the first terminal section connected to a first end of the intermediate section at a substantially right angle, said first terminal section adapted to depress the switchhook arms and hold them depressed, the second terminal section connected to the second end of said intermediate section at a substantially right angle, said second terminal section adapted to abut against the section of said switchhook connecting the switchhook arms.

12. The device in accordance with claim 11 wherein said lock is mounted on said second terminal section with said connected latch bar on the outside of said frame means.

13. The device in accordance with claim 12 wherein when said latch bar is positioned under said switchhook, said latch bar abuts the side opposite the side of the connecting section of said switchhook that said second terminal section abuts.

14. The device in accordance with claim 13 wherein said first and second terminal sections extend from the same side of said intermediate section.

15. The device in accordance with claim 11 wherein said first terminal section is formed in a first T-shaped configuration, the bar portion of said first configuration connected at its top edge to said intermediate section, the leg of said first configuration being narrower than the distance between the switchhook arms.

16. The device in accordance with claim 11 or 15 wherein said second terminal section is formed in a second T-shaped configuration, the bar portion of said second configuration connected at its top edge to said intermediate section, the leg of said second configuration being narrower than the distance between the switchhook arms, said lock mounted in the leg of said second configuration.

* * * * *